United States Patent [19]

Sera

[11] 4,386,898
[45] Jun. 7, 1983

[54] MOLDING MACHINE FOR ENCAPSULATION

[75] Inventor: Michitoshi Sera, Yokohama, Japan

[73] Assignee: Tokyo Shibaura Denki Kabushiki Kaisha, Japan

[21] Appl. No.: 271,118

[22] Filed: Jun. 8, 1981

[30] Foreign Application Priority Data

Jun. 18, 1980 [JP] Japan .................................. 55-81363

[51] Int. Cl.³ .............................................. B29G 3/00
[52] U.S. Cl. ................................ 425/145; 264/328.4; 264/328.8; 425/544; 425/588
[58] Field of Search ............... 264/328.4, 328.5, 328.8; 425/145, 544, 588

[56] References Cited

FOREIGN PATENT DOCUMENTS 54-92059 7/1979 Japan .
55-42807 3/1980 Japan .

Primary Examiner—Thomas P. Pavelko
Attorney, Agent, or Firm—Finnegan, Henderson, Farabow, Garrett & Dunner

[57] ABSTRACT

A molding machine for encapsulation including a transfer molding die provided with a plurality of pots which comprises a transfer molding press, a molding die including a plurality of pots allowing for the passage of plungers integrally formed with the rods of the cylinders, a plurality of runners branched off from the pots, a plurality of cavities connected to the runners through the corresponding gates, and displacement transducers for detecting the rate of the displacement of the plungers, variable flow rate control valves communicating with lines connected to the cylinders, and a control circuit for controlling the operation of the variable flow rate control valve in accordance with output signals from the displacement transducers, thereby causing the plungers corresponding to cylinders to be moved exactly at the same speed.

5 Claims, 6 Drawing Figures

MOLDING MACHINE FOR ENCAPSULATION

BACKGROUND OF THE INVENTION

This invention relates to a molding machine for encapsulation which comprises a transfer molding press having a plurality of cylinders provided with resin-pressing plungers; and a molding die formed of a plurality of pots corresponding to the cylinders, runners branched off from the pots and cavities connected to the runners through the corresponding gates, and more particularly to a low pressure transfer molding machine adapted for the resin-molding of a large number of semiconductor elements set on a lead frame. Hitherto, semiconductor elements mounted on a lead frame have been resin-molded by a transfer molding press provided with a transfer die having a single pot and a single cylinder provided with resin-pressing plunger (hereinafter referred to as "resin-pressing cylinder"). The conventional resin-molding process comprises throwing preheated thermosetting resin into a pot drilled in an upper die component. The thermosetting resin is pressed by a resin-pressing plunger to be forced out of the pot through runners and gates into the cavities in which the thermosetting resin is fitted. Semiconductor elements mounted on the lead frame and previously received in the cavities are sealed in the resin. The above-mentioned conventional resin-molding die comprises 2 to 10 runners branched off from a single pot and about 20 cavities formed in the respective runners.

In recent years, a low pressure transfer molding machine is increased in capacity, die-working technology is improved, and automation of a resin-molding system is more advanced. As a result, a large capacity molding die is developed which is adapted for the simultaneous resin-molding of a large number of semiconductor elements. Considering, however, the fluidity of resin, a limitation is naturally imposed on a maximum length of a runner. In other words, the maximum runner length should be set at about 30 to 50 cm. It has been shown, therefore, that a single pot formed in a die presents difficulties in effecting the simultaneous resin-molding of a plurality of lead frames on which a large number of semiconductor elements are mounted. For this reason, a novel die has been developed, as set forth in Japanese patent disclosure No. 54-92,059 which is provided with a plurality of pots. A transfer molding press has also been proposed in the patent disclosure No. 54-92,059 which comprises resin-pressing cylinders provided in a number corresponding to the above-mentioned plural pots.

However, it involves considerable difficulties to attempt to mechanically synchronize the timing in which a plurality of plungers of a molding machine comprising the aforesaid molding die and transfer molding press are to be operated, in view of the intrinsic resistance of the respective cylinders and the fluid resistance in the passage of a molding machine. FIG. 1 shows the relationship between the viscosity of a resin thrown into a pot formed in a die and the points of time at which the resin undergoes physical change. Now the resin begins to be hardened at a point of time t1. Then a large number of void spaces appear in the resin filled in the cavities at a point of time t3 for the molding of semiconductor elements than in the resin filled in the cavities at a point of time t2 for the same purpose.

FIG. 2 shows a change with time in the internal pressure of the resin filled in the cavities. Curve $\alpha$ indicates a normal change with time in the internal pressure of the resin, and curve $\beta$ denotes changes with time in the internal pressure of the resin which start at a point of time delayed by t0 from that point of time at which the above-mentioned normal change with time begins. Now let it be assumed that two cavities are formed in a transfer molding press. Where two different patterns (represented by curves $\alpha$, $\beta$) of changes with time appear in the internal pressure of resins filled in the two cavities, then two semiconductor elements sealed in the resins are simultaneously taken out of the transfer molding press in a time T after the initial operation of the molding press. After the internal pressure of the resins filled in the two cavities indicates no change with time, namely, reaches an equilibrium state, the resin filled in one of the two cavities is allowed to stand for a length of time t4. The resin filled in the other cavity is allowed to stand for a length of time t5. In this case, a second resin which indicates a history represented by curve $\beta$ has a lower hot hardness immediately after taken out of one of the two cavities than that of a first resin which indicates a history denoted by curve $\alpha$. When handled, therefore, the second resin is undesirably more easily deformed by an external force than the first resin.

Where, for example, two resins indicate different histories namely, changes with time in internal pressure after inserted into the same molding machine, then the resin filled in the die of the molding machine later than the preceding one shows a different hardening behavior from the previous one. Therefore, variations appear in the reliability of semiconductor elements sealed in such two different types of resin. Moreover in recent years, resins are developed which can be hardened more quickly than has been possible in the past. Therefore, variations in a period extending from a point of time at which a resin is poured into the pot of a molding press to a point of time at which the resin is brought into a cavity formed in the molding die prominently affects the reliability of a semiconductor element sealed in the resin. Further, a bonding wire for connecting the electrode of a semiconductor element to an external lead tends to get finer in recent years and consequently is ready to be more easily affected by a history traced by a resin after thrown into the die.

SUMMARY OF THE INVENTION

It is accordingly the object of this invention to provide a low pressure type transfer molding machine which enables plungers integrally formed with the rods of a plurality of resin-pressing cylinders to fall at the same speed, thereby causing a large number of semiconductor devices to be sealed in a resin with a high reliability of performance.

To attain the above-mentioned object, this invention provides a transfer molding machine for encapsulation which comprises:

a transfer molding press provided with a plurality of resin-pressing cylinders;

a molding die including a plurality of pots allowing for the passage of plungers integrally formed with the piston rods of the plural cylinders, a plurality of runners branched off from the pots and a plurality of cavities connected to the runners through the corresponding gates;

displacement transducers provided in a number corresponding to that of the plural plungers to detect the rate of their displacement;

variable fluid flow rate control means communicating with lines connected to the plural cylinders; and a control circuit for controlling the operation of the variable fluid flow rate control means in accordance with an output signal from the displacement transducer, thereby causing the plungers corresponding to the cylinders to be moved at the same speed.

The above-mentioned arrangement causes the plungers of the plural cylinders to be moved at the same rate, thereby enabling a resin to be brought into the respective cavities at a uniform speed and consequently preventing the resins filled in the cavities from being hardened at different rates.

BRIEF DESCRIPTION OF THE DRAWINGS

Other objects and advantages of this invention will become apparent from the following detailed description when taken in conjunction with the accompanying drawings, in which.

DETAILED DESCRIPTION OF THE PREFERRED EMBODIMENT

Figure 1:
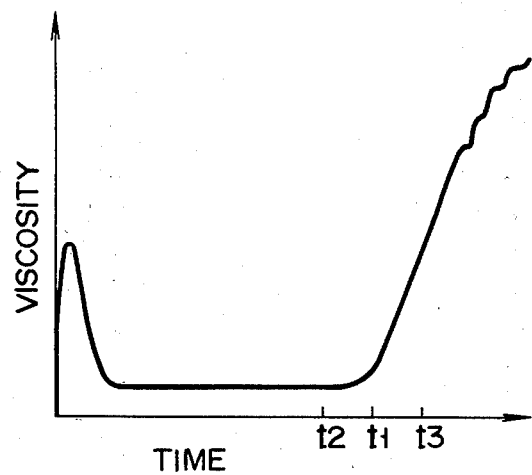
FIG. 1 indicates changes with time in the viscosity of a resin poured through a pot of a molding die and then pressed by a plunger.
Figure 2:
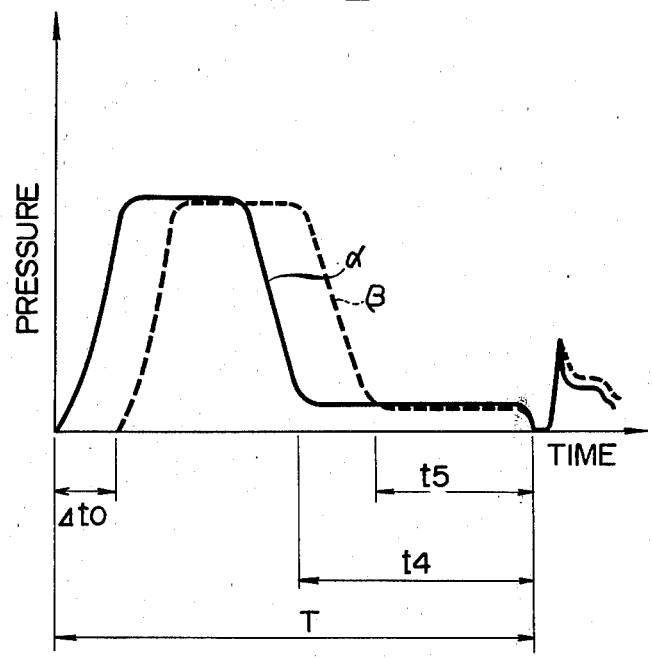
FIG. 2 shows changes with time in the internal pressure of a resin brought into the respective cavities.
Figure 3:
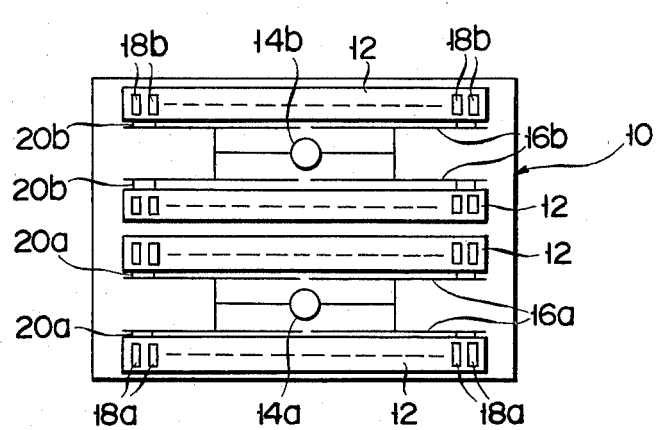
FIG. 3 is a schematic plan view of the lower component of a molding die.

FIG. 3 shows the lower component 10 of a molding die embodying this invention, and lead frames 12. The lower component 10 of the molding die comprises two pots 14a, 14b, runners 16a, 16b respectively branched off from the pots 14a, 14b and a large number of cavities 18a, 18b connected to the runners 16a, 16b through the corresponding gates 20a, 20b.

A preheated resin is thrown into the pots 14a, 14b and conducted under pressure through the runners 16a, 16b and gates 20a, 20b into the cavities 18a, 18b.

Figure 4:
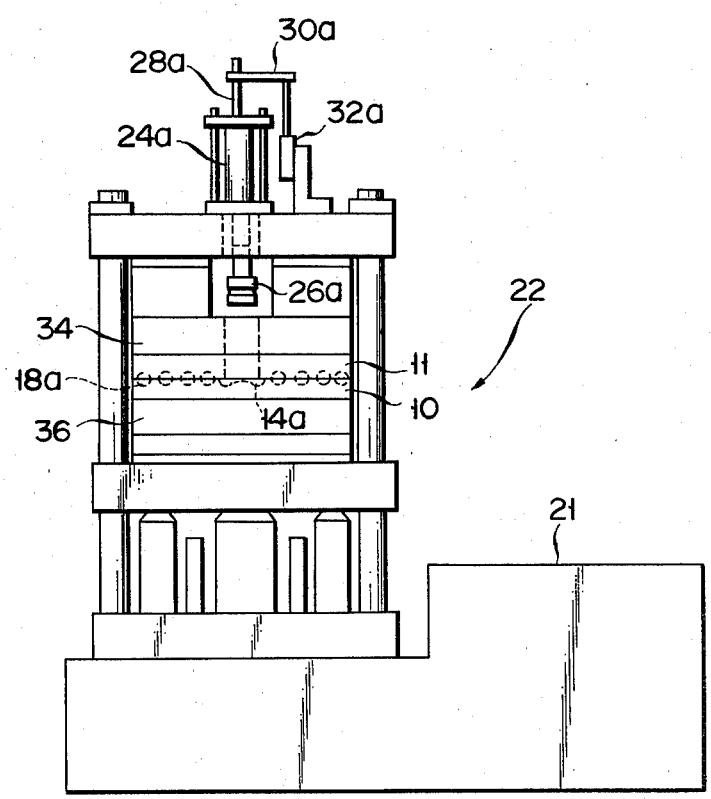
FIG. 4 is a front view of a transfer molding machine embodying the invention, showing the molding die set in the transfer molding press.
Figure 5:
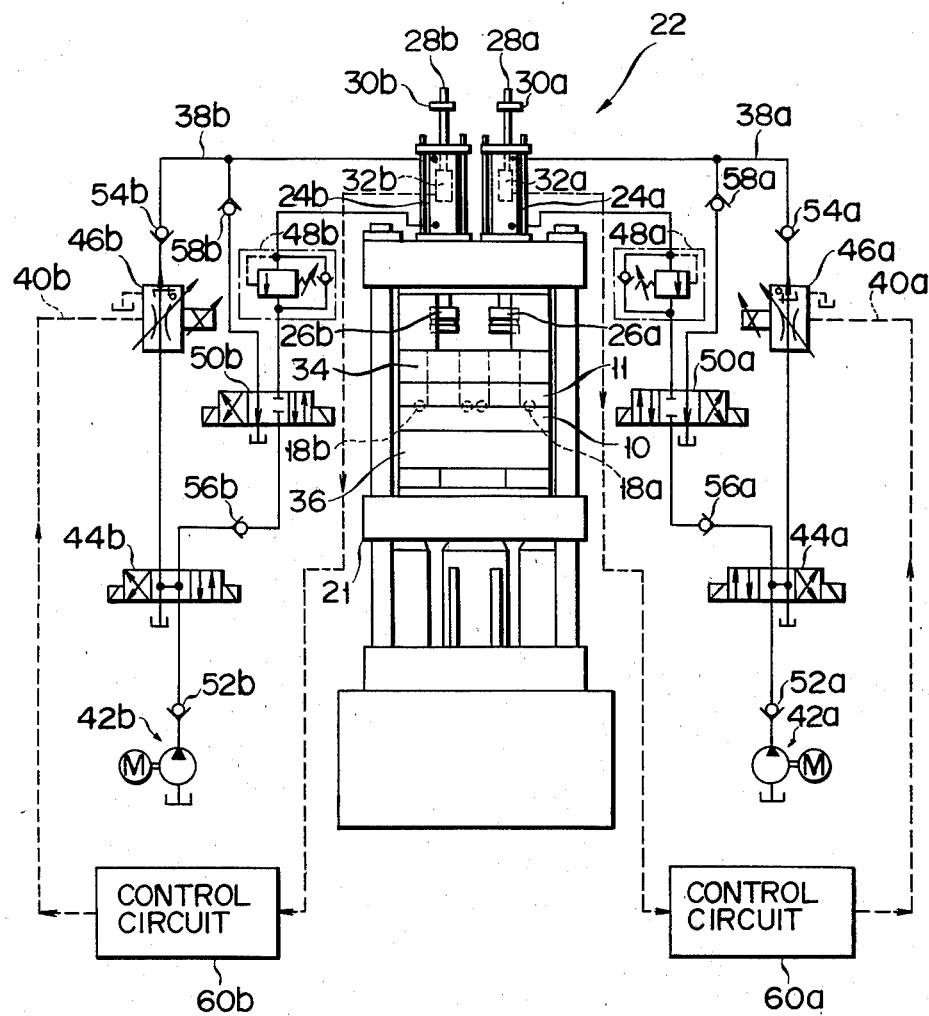
FIG. 5 sets forth a side view of the transfer molding machine of FIG. 4 and circuit diagrams of the drive systems and signal transmission systems.

FIG. 4 is a front view of a transfer molding machine 22 comprising a transfer molding press 21 and upper and lower molding die components 11, 10. FIG. 5 is a side view of the transfer molding machine 22. The transfer molding press 21 is fitted with the lower die component 10 and upper die component 11. The transfer molding press 21 has two resin-pressing cylinders 24a, 24b (FIG. 5) disposed in the upper part. Plungers 26a, 26b are reciprocated through the corresponding pots 14a, 14b in accordance with the movement of a piston head through the respective cylinders 24a, 24b.

Piston rods 28a, 28b jointly movable with the plungers 26a, 26b are respectively fitted with arms 30a, 30b. These arms 30a, 30b are connected to displacement transducers 32a, 32b for sensing the rate of the displacement of the plungers 26a, 26b. A heater which heats the die to melt the preheated resin thrown into the pots is provided in the upper section 34 on the upper die component 11 and the lower section 36 beneath the lower die component 10.

FIG. 5 shows the drive systems 38a, 38b and signal transmission systems 40a, 40b of the transfer molding machine 22. The drive system 38a comprises a pump 42a, 3-position valve 44a, solenoid type variable flow control valve 46a, counterbalance valve 48a, 3-position valve 50a and check valves 52a, 54a, 56a, 58a. Similarly, the other drive system 38b comprises a pump 42b, 3-position valve 44b, solenoid type variable flow control valve 46b, counterbalance valve 48b, 3-position valve 50b, and check valves 52b, 54b, 56b, 58b.

Figure 6:
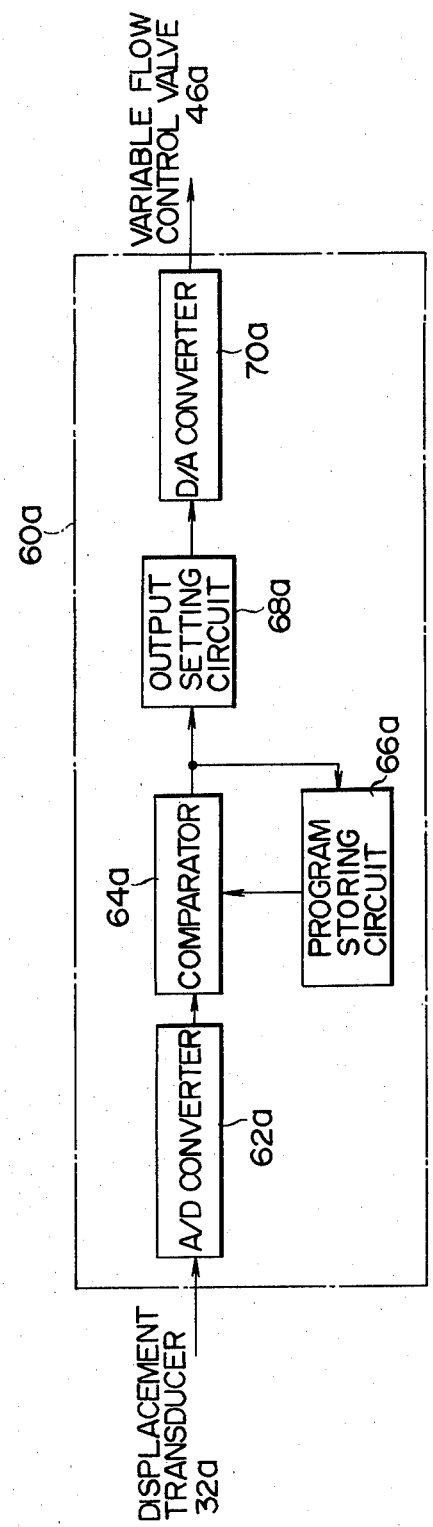
FIG. 6 is a block diagram of a control circuit included in the transfer molding machine of the invention.

The control circuit 60a of the signal transmission system 40a comprises, as shown in FIG. 6, an A/D converter 62a for converting an output analog signal from the displacement transducer 32a into a digital signal, comparator 64a, program-storing circuit 66a, output-setting circuit 68a formed of a group of shift registers to convert a digital output signal from the comparator 64a into a digital signal for controlling the solenoid type variable flow control valve 46a, and D/A converter 70a for converting the digital output signal from the output-setting circuit 68a into an analog signal and supplying the converted analog signal to the solenoid of the solenoid type variable flow control valve 46a. The output signal from the A/D converter 62a is compared by the comparator 64a with a data at which a program-storing circuit 66a is preset. The program-storing circuit 66a is formed of a group of shift registers driven by an output signal from the comparator 64a. The control circuit of the signal transmission system 40b has exactly the same arrangement as that of FIG. 6.

Description is now given of the drive system 38a and signal transmission system 40a of a transfer molding machine embodying this invention.

Where the 3-position valve 44a and another 3-position valve 50a are moved to the left side of FIG. 5, then, for example, an oil stream discharged from the pump 42a is brought into a chamber provided in the upper portion of the cylinder 24a for pressurizing the oil stream through the check valve 52a, 3-position valve 44a, solenoid type variable flow control valve 46a and check valve 54a. The pressurized oil stream presses downward the piston head integrally formed with the plunger 26a. An oil stream held in the lower oil stream-pressurizing chamber of the cylinder 24a is discharged through the counterbalance valve 48a, and 3-position valve 50a, causing the plunger 26a to be forced downward. The rate of the downward movement of the plunger 26a is detected by the displacement transducer 32a through the corresponding piston rod 28a and arm 30a. This displacement transducer 32a is, for example, a strain gauge type displacement transducer. An output signal from the displacement transducer 32a is supplied to the A/D converter 62a of the control circuit 60a, and converted into a digital signal. The converted digital signal is conducted to the comparator 64a and compared with data showing the optimum rate of the downward movement of the plunger which is already stored in the program-storing circuit 66a. A signal showing a difference between a value indicated by the converted digital signal and that of the previously stored data is sent forth to the output-setting circuit 68a, which in turn issues a digital signal for controlling the variable flow control valve 46a in accordance with the difference signal. The control digital signal is converted by the D/A converter 70a into an analog signal for adjusting the operation of the solenoid of the variable flow control valve 46a. With the foregoing embodiment, the variable flow control valve 46a continuously varies the flow rate of fluid, for example, a pressured oil stream in proportion to an amount of current conducted through the solenoid of the control valve 46a. Where the plunger happens to fall at a greater rate than programmed, then the control circuit 60a supplies the variable flow control valve 46a with an analog signal for restricting the operation thereof. Where the plunger happens to fall at a smaller rate than programmed, then the control circuit 60a sends forth an analog signal to the variable flow control valve 46a to leave it open. Thus, the rate of the downward movement of the plunger 26a is always controlled by a comparison between the value of an output digital signal from the A/D converter 62a and value of a previously programmed data denoting the optimum rate of the downward movement of the plunger 26a.

The same operation as described above takes place in the other group of the drive system 38b and signal transmission system 40b. Where, therefore, a prescribed value is programmed, then two plungers can be moved exactly at the same time.

The program-storing circuit 66a of FIG. 6 may be applied in common to the drive systems 40a, 40b.

Where the 3-position valve 44a and another 3-position valve 50a are moved to the right side of FIG. 5, then an oil stream discharged from the pump 42a is brought into the lower oil stream-pressurizing chamber through the check valve 52a, 3-position valve 44a, check valve 56a, 3-position valve 50a and counterbalance valve 48a, thereby causing the piston head of the cylinder to be pushed upward. An oil stream held in the upper oil stream-pressurizing chamber of the cylinder 24a is discharged through the check valve 58a and 3-position valve 50a, causing the plunger 26a to be lifted.

With the transfer molding machine of this invention, the rate of the downward movement of the plunger is sensed. Comparison is made between the value of a signal denoting the actual rate of the downward movement of the plunger and that of previously programmed data representing the optimum rate of the downward movement of the plunger, thereby controlling the flow rate of an oil stream supplied to the plunger under pressure. Therefore, a plurality of plungers can be moved exactly at the same speed, enabling a resin to be brought into a plurality of cavities at a uniform rate and speed. Consequently a resin filled in a large number of cavities formed in a large capacity molding die can be quickly hardened at a uniform rate. Further with the molding machine of the invention, it is possible to change a speed at which a resin is filled in the numerous cavities through, for example, two pots in precise synchronization at any changed point of time.

What is claimed is:

1. A molding machine for encapsulation which comprises:
    a transfer molding press having a plurality of cylinders, a piston rod associated with each said cylinder and movable relative thereto in accordance with pressurized fluid delivered to the cylinders, and a resin-pressing plunger movable with each said piston rod;
    a molding die including a plurality of pots allowing for the passage of said plungers, runners branched off from the pots, and a plurality of cavities connected to the runners through corresponding gates;
    a displacement transducer for detecting the rate of movement or displacement of each said plunger;
    means generating an output signal from each of said transducers in accordance with the rate of displacement of the associated plunger;
    a variable fluid flow rate control means associated with each said cylinder for controlling the fluid flow rate thereto;
    a control circuit for receiving the output signal from each said transducer and operable to control the operation of the fluid flow rate control means to cause the plungers to be moved at the same speed.

2. The molding machine for encapsulation according to claim 1, wherein said control circuit comprises a plurality of control units each of which is connected to a respective displacement transducer and including a comparator and program-storing circuit; each output signal from the displacement transducers denoting the rate of displacement of the associated plunger which is compared by the comparator with output signals from the program-storing circuit; the comparator issuing an output signal for controlling the operation of the variable fluid flow rate control means in accordance with the result of said comparison.

3. The molding machine for encapsulation according to claim 2, wherein said control circuit further comprises:
    first conversion means for converting an output analog signal from the displacement transducer into a digital signal and sending forth the converted digital signal to the comparator; and
    second conversion means for converting a digital signal received from the output-setting circuit into an analog signal and supplying the converted analog signal to the variable fluid flow rate control means.

4. The molding machine for encapsulation according to claim 3, wherein the program-storing circuit is actuated by the output signal from the comparator.

5. The molding machine for encapsulation according to any one of claims 1 or 2–4, wherein each of the variable fluid flow rate control means comprises a proportional control valve operated by a solenoid which is connected to the control circuit, the value of current flowing to the solenoids being varied by the output signal from said control circuit, said proportional control valve being operable to continuously adjust the flow rate of pressurized fluid to said cylinders in proportion to the magnitude of current conducted through the associated solenoid.

* * * * *